(12) United States Patent
Minoshima et al.

(10) Patent No.: US 8,925,661 B2
(45) Date of Patent: Jan. 6, 2015

(54) ELECTRIC WORKING VEHICLE

(75) Inventors: Toshikazu Minoshima, Kasumigaura (JP); Kichio Nakajima, Kasumigaura (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 163 days.

(21) Appl. No.: 13/503,687

(22) PCT Filed: May 19, 2011

(86) PCT No.: PCT/JP2011/061525
§ 371 (c)(1),
(2), (4) Date: Apr. 24, 2012

(87) PCT Pub. No.: WO2012/008219
PCT Pub. Date: Jan. 19, 2012

(65) Prior Publication Data
US 2013/0075170 A1 Mar. 28, 2013

(30) Foreign Application Priority Data
Jul. 15, 2010 (JP) .................. 2010-160645

(51) Int. Cl.
*B60K 1/00* (2006.01)
*B60K 11/00* (2006.01)
*B60L 11/08* (2006.01)
*B60L 7/06* (2006.01)

(52) U.S. Cl.
CPC . *B60K 11/00* (2013.01); *B60K 1/00* (2013.01); Y10S 903/902 (2013.01); *B60L 11/08* (2013.01); Y02T 10/648 (2013.01); *B60L 2200/40* (2013.01); *B60L 7/06* (2013.01); Y02T 10/7077 (2013.01)
USPC ................. 180/65.31; 180/65.1; 903/902

(58) Field of Classification Search
USPC ............................... 180/65.1, 65.31
See application file for complete search history.

(56) References Cited

U.S. PATENT DOCUMENTS

| | | | | |
|---|---|---|---|---|
| 4,307,300 | A * | 12/1981 | Kisami | 307/9.1 |
| 4,750,356 | A * | 6/1988 | Sommer | 73/170.14 |
| 4,843,880 | A * | 7/1989 | Sommer | 73/170.14 |
| 5,280,223 | A * | 1/1994 | Grabowski et al. | 318/139 |
| 6,186,254 | B1 * | 2/2001 | Mufford et al. | 429/442 |

(Continued)

FOREIGN PATENT DOCUMENTS

| | | | |
|---|---|---|---|
| JP | 62-110402 A | 5/1987 | |
| JP | 06-046505 A | 2/1994 | |

(Continued)

*Primary Examiner* — J. Allen Shriver, II
*Assistant Examiner* — Travis Coolman
(74) *Attorney, Agent, or Firm* — Mattingly & Malur, PC

(57) ABSTRACT

Wheel drive motors (8) constituted of electric motors for driving rear wheels (7) are provided on a vehicle body (2) of a dump truck (1). Each wheel drive motor (8) is connected to a main power generator (12) through a bidirectional converter (20) and the like and driven by power supplied from the main power generator (12). A resistor (21) that consumes regenerative power from each wheel drive motor (8) is connected to the bidirectional converter (20). Cooling air is supplied to the resistor (21) from a blower (24). Operations of a switch (23) of the resistor (21) and the blower (24) are controlled by a controller (28). A mode selecting switch (29) for selecting a heating mode (A), a blowing mode (B), and a heating and blowing mode (C) is connected to the controller (28).

10 Claims, 10 Drawing Sheets

(56) References Cited

U.S. PATENT DOCUMENTS

| | | | |
|---|---|---|---|
| 7,315,144 B2 * | 1/2008 | Imaie et al. | 318/380 |
| 7,609,024 B2 * | 10/2009 | Ahmad et al. | 318/811 |
| 7,841,434 B2 * | 11/2010 | Shimada et al. | 180/65.27 |
| 8,001,906 B2 * | 8/2011 | King et al. | 105/61 |
| 8,008,877 B2 * | 8/2011 | Fushiki et al. | 318/372 |
| 8,025,115 B2 * | 9/2011 | King et al. | 180/65.275 |
| 8,324,846 B2 * | 12/2012 | Marchand et al. | 318/380 |
| 8,376,476 B2 * | 2/2013 | Ikeda et al. | 303/152 |
| 8,453,772 B2 * | 6/2013 | Brown | 180/65.285 |
| 2006/0086547 A1 * | 4/2006 | Shimada et al. | 180/65.4 |
| 2010/0051359 A1 | 3/2010 | Fushiki et al. | |
| 2011/0094808 A1 * | 4/2011 | Mazumdar et al. | 180/65.22 |
| 2011/0120787 A1 * | 5/2011 | Lee et al. | 180/65.1 |

FOREIGN PATENT DOCUMENTS

| | | |
|---|---|---|
| JP | 08-154304 A | 6/1996 |
| JP | 2006-230084 A | 8/2006 |
| JP | 2010-88289 A | 4/2010 |

* cited by examiner

Fig.5

| MODE SELECTING SWITCH | HEAT GENERATION | AIR BLOW | CONDITION |
|---|---|---|---|
| OFF | × | × | |
| HEATING MODE A | O | × | SNOWSTORM, HEAVY RAINS |
| BLOWING MODE B | × | O | WATER IS STORED AROUND RESISTOR |
| HEATING AND BLOWING MODE C | O | O | RESISTOR IS FROZEN UP |

ELECTRIC WORKING VEHICLE

TECHNICAL FIELD

The present invention relates to an electric working vehicle preferably used for a dump truck and the like, for example.

BACKGROUND ART

In general, there is known an electric working vehicle adopting an electric drive system for a traveling drive system like a large-sized dump truck and the like. Such an electric working vehicle is provided with an electric motor disposed to a vehicle body and an inverter provided between a direct current power supply such as a battery and the electric motor. On the other hand, there is known an electric working vehicle having a configuration that a resistor is connected to an inverter to consume electro motive force regenerated by an electric motor and a blower which supplies cooling air to the resistor is provided (Patent Document 1, Patent Document 2).

PRIOR ART DOCUMENTS

Patent Documents

Patent Document 1: Japanese Patent Laid-Open No. 2006-230084 A
Patent Document 2: Japanese Patent Laid-Open No. Hei 6-46505 A

SUMMARY OF THE INVENTION

Meanwhile, in the electric working vehicle according to the above-described conventional art, the resistor may be frozen up in cold climates and, on the other hand, the resistor may get wet with rain water at the time of rainfall. In this case, insulation properties between a circuit for the resistor and a vehicle body frame are deteriorated, and a so-called earth fault that the circuit is short-circuited with respect to the ground may possibly occur. As a function that avoids this earth fault trouble, a configuration that carries out heat generation using the resistor and air blow using a blower at the same time can be considered. According to this configuration, pieces of ice can be molten or moisture can be evaporated by the heat generation of the resistor, and the resistor can be dried by the air blow from the blower, thereby eliminating factors that deteriorate the insulation properties.

However, simultaneously performing the heat generation and the air blow may be inappropriate depending on a state of the resistor, a condition of outside air, and the like. For example, when water is stored around the resistor to considerably deteriorate the insulation properties, the resistor cannot sufficiently generate heat. In this case, even if power is fed to the resistor, an amount of leaking power is large, and a problem of poor energy efficiency arises. On the other hand, when operating the blower in a snowstorm or heavy rains, snow and ice or rain water may be possibly drawn into the periphery of the resistor due to the effect of the air blow, and the insulation properties of the resistor may be further deteriorated.

In view of the above-described problem with the conventional art, it is an object of the present invention to provide an electric working vehicle that can arbitrarily select heat generation using a resistor and air blow using a blower in accordance with a state of the resistor, a condition of outside air, and the like.

(1) In order to solve the above-described problem, the present invention is applied to an electric working vehicle comprising: a traveling drive electric motor provided to a vehicle body; a bidirectional converter that is provided to the vehicle body, converts direct current power from a direct current power supply into alternating current power having a variable frequency to drive the electric motor and converts output of alternating current power from the electric motor into direct current power; a resistor that is provided to the vehicle body and connected to the bidirectional converter so as to consume electro motive force regenerated by the electric motor; a blower that supplies cooling air to the resistor; and a mode selecting switch; wherein the mode selecting switch is configured to select any one mode from a heating mode for performing heat generation in the resistor, a blowing mode for blowing air to the resistor by using the blower, and a heating and blowing mode for simultaneously performing the heat generation using the resistor and the air blow using the blower.

With this arrangement, an operator can select an appropriate mode from the three modes that can be selected using the mode selecting switch in accordance with a state of the resistor, a condition of outside air, and the like. Specifically, for example, the heating mode for performing the heat generation alone can be selected in case of a snowstorm or heavy rains, whereby moisture in the periphery can be evaporated by the heat generation of the resistor while avoiding the blowing-in of the snowstorm and the like. On the other hand, when water is stored around the resistor, the blowing mode for performing air blow alone can be selected to blow off the stored water. Furthermore, when the resistor is frozen up, the heating and blowing mode for simultaneously performing the heat generation and the air blow can be selected to dry the resistor while melting ice of the resistor. As described above, a mode in accordance with a state of the resistor or outside air can be selected to enhance the insulation properties of the resistor, and the regenerative power of the electric motor can be assuredly consumed by the resistor.

(2) According to the present invention, a controller is connected to the bidirectional converter, the resistor, and the blower to control those operations, and the controller is configured to control operations of the bidirectional converter, the resistor, and the blower in accordance with acceleration and deceleration of the vehicle body when the vehicle body is traveling, and control operations of the resistor and the blower in accordance with a mode selected by the mode selecting switch when the vehicle body is at a stop.

With this arrangement, when the vehicle body is traveling, the controller controls operations of the bidirectional converter, the resistor, and the blower in accordance with the acceleration and the deceleration of the vehicle body. Therefore, at the time of acceleration of the vehicle body, direct current power can be converted into alternating current power by the bidirectional converter to be supplied to the electric motor in a state that the heat generation using the resistor and the air blow using the blower are stopped. On the other hand, at the time of deceleration of the vehicle body, output of the alternating current power from the electric motor can be converted into the direct current power by the bidirectional converter, this direct current power can be consumed by the heat generation of the resistor, and the resistor can be cooled by the air blow using the blower. Moreover, under the circumstance that the vehicle body is at a stop, since the operations of the resistor and the blower are controlled in accordance with a mode selected by the mode selecting switch, the insulation properties of the resistor can be previously enhanced before traveling of the vehicle body when a driver selects an appropriate mode in accordance with a state of the resistor or outside air.

(3) According to the present invention, the controller is configured to convert direct current power from the direct current power supply into alternating current power by the bidirectional converter to be supplied to the electric motor, stop the heat generation of the resistor, and stop the air blow of the blower when the vehicle body is accelerating, configured to convert electro motive force of an alternating current regenerated by the electric motor into direct current power by the bidirectional converter, enable the heat generation in the resistor so as to consume the direct current power, and supply cooling air to the resistor by the blower when the vehicle body is decelerating, and configured to stop operations of the bidirectional converter and control operations of the resistor and the blower in accordance with a mode selected by the mode selecting switch when the vehicle body is at a stop.

With this arrangement, the controller can stop the heat generation using the resistor and the air blow using the blower to eliminate extra power consumption at the time of acceleration of the vehicle body. Since the direct current power is converted into the alternating current power by the bidirectional converter to be supplied to the electric motor in this state, the direct current power from the direct current power supply can be supplied to the electric motor without being consumed by the resistor.

On the other hand, at the time of deceleration of the vehicle body, the alternating current electro motive force regenerated by the electric motor is converted into the direct current power by the bidirectional converter, and this direct current power is consumed by the heat generation of the resistor, thereby producing braking force in the electric motor. In addition, the cooling air is supplied to the resistor by the blower, thereby cooling the resistor heated by the regenerative power.

When stopping the vehicle body, the operation of the bidirectional converter is stopped so that the direct current power from the direct current power supply can be supplied to the resistor. Since the operations of the resistor and the blower are controlled in accordance with a mode selected by the mode selecting switch in this state, the direct current power from the direct current power supply can be used to heat the resistor when the heating mode or the heating and blowing mode is selected.

(4) According to the present invention, a temperature sensor that detects a temperature of the resistor, and a mode change processing device which, in the state of the heating mode being selected by the mode selecting switch, maintains the heating mode when an increase in temperature of the resistor is detected by the temperature sensor and changes a mode to the blowing mode when an increase in temperature of the resistor is not detected by the temperature sensor.

This configuration comprises the mode change processing device that changes the current mode to the blowing mode when an increase in temperature of the resistor is not detected by the temperature sensor with the heating mode being selected. Here, when a temperature of the resistor is not increased in the heating mode, it can be considered that selection of the heating mode is inappropriate like a situation that the insulation properties of the resistor are greatly deteriorated, for example. In such a case, since the heating mode switching device can change the current mode to the blowing mode in which air blow using the blower is performed, the water stored around the resistor can be blown off to enhance the insulation properties of the resistor. As a result, the inappropriate heating mode can be automatically changed to the blowing mode, and an appropriate operation can be carried out to keep a machine stop time to the minimum.

(5) According to the present invention, the resistor is accommodated in a box-shaped grid box in which the blower is disposed, a differential pressure sensor that detects a pressure difference between the upstream side and the downstream side of the resistor with respect to a blowing direction from the blower is provided in the grid box, and a mode change processing device which, in the state of the blowing mode being selected by the mode selecting switch, maintains the blowing mode when the pressure difference detected by the differential pressure sensor is larger than a predetermined minimum pressure difference and changes a mode to the heating mode when the pressure difference detected by the differential pressure sensor is smaller than the minimum pressure difference.

This configuration comprises the mode change processing device that changes the current mode to the heating mode when a pressure difference detected by the differential pressure sensor is smaller than the minimum pressure difference with the blowing mode being selected. Here, when a pressure difference between a pressure of the resistor on the upstream side and that on the downstream side in the blowing mode is smaller than the minimum pressure difference, it can be considered that selection of the blowing mode is inappropriate like a situation where the blower has failed to operate properly, for example. In such a case, since the blowing mode switching device can change the current mode to the heating mode for performing the heat generation using the resistor, moisture can be evaporated by the heat generation of the resistor, thus enhancing insulation properties of the resistor. As a result, the inappropriate blowing mode can be automatically changed to the heating mode, and an appropriate operation can be carried out to keep the machine stop time to the minimum.

BRIEF DESCRIPTION OF THE DRAWINGS

FIG. 5 is an explanatory view showing a relationship between a mode selecting switch, a heating operation, and a blowing operation.

MODE FOR CARRYING OUT THE INVENTION

Hereinafter, a detailed description will be given of an electric working vehicle according to an embodiment of the present invention by taking a rear wheel drive dump truck as an example with reference to the accompanying drawings.

FIG. 1 to FIG. 6 show a first embodiment of an electric working vehicle according to the present invention.

Figure 1:
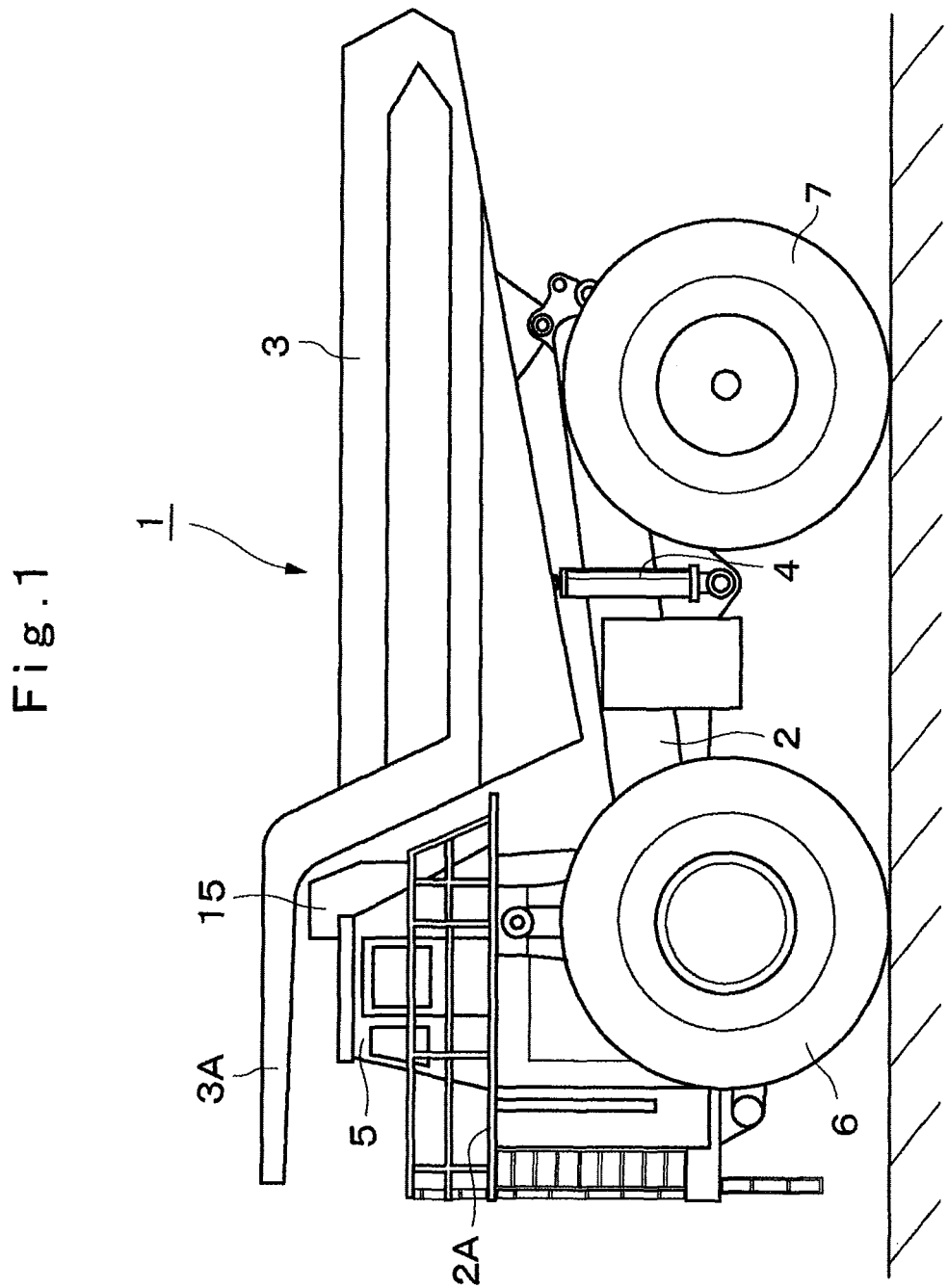
FIG. 1 is a front view of a dump truck according to a first embodiment of the present invention.
Figure 2:
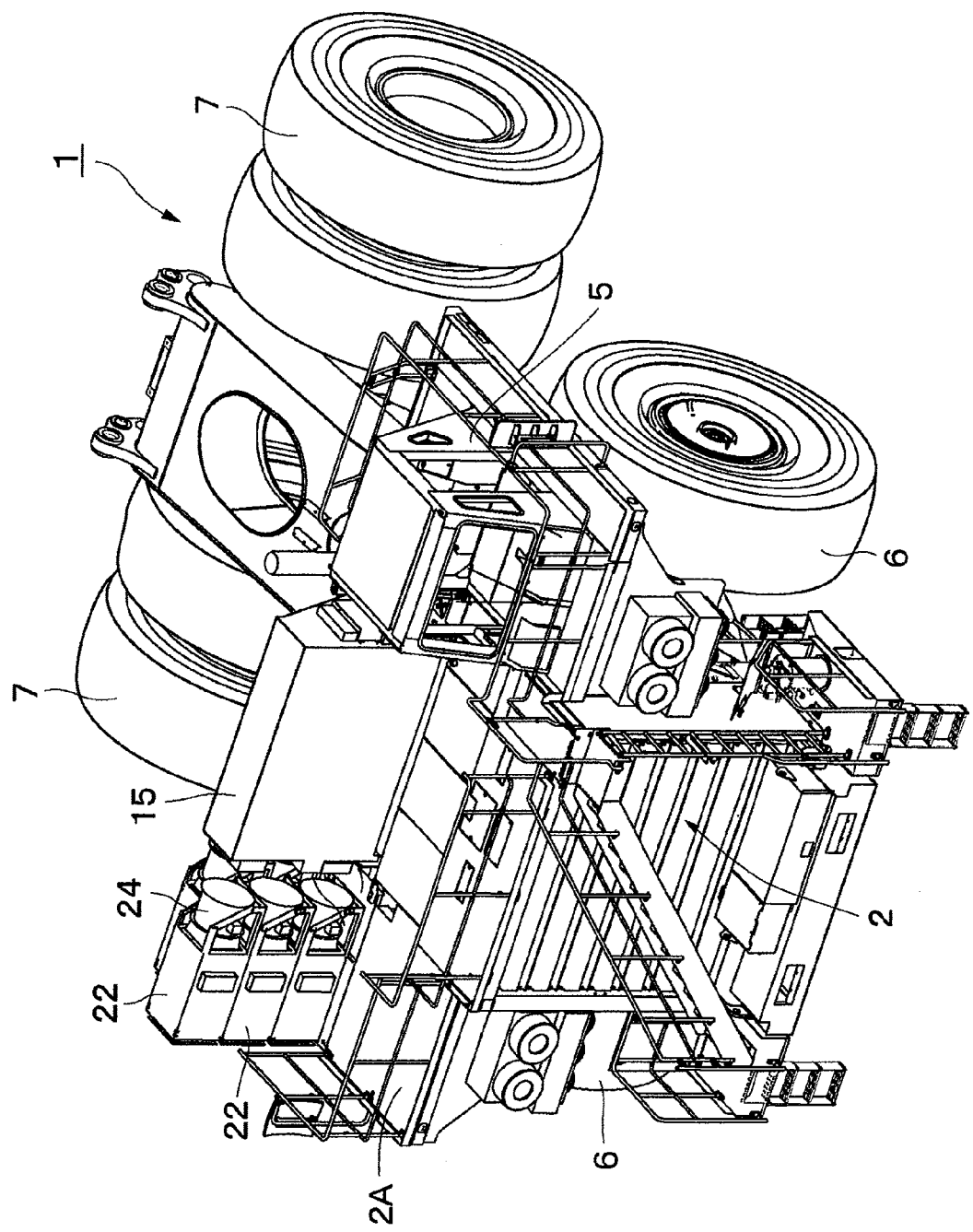
FIG. 2 is a perspective view showing the dump truck with a vessel being removed.

In the drawings, designated at 1 is a dump truck as the electric working vehicle. As shown in FIG. 1 and FIG. 2, the dump truck 1 has a robust frame structure and is largely constituted of a vehicle body 2 that is self-propelled with front wheels 6 and rear wheels 7 as below-described wheels and a vessel 3 as a loading platform mounted on the vehicle body 2 so as to be liftable with a rear end side being used as a fulcrum. The vessel 3 has a protector 3A that substantially completely covers a cabin 5 from above and performs lifting motion (tilt) by using hoist cylinders 4 arranged on both left and right sides of the vehicle body 2.

Indicated at 5 is the cabin that is placed below the protector 3A and provided in a front portion of the vehicle body 2. This cabin 5 is placed on, for example, the left side of the vehicle body 2 and arranged on a deck portion 2A serving as a flat floor panel. The cabin 5 forms an operator's room which a driver (an operator) of the dump truck 1 gets on/off, and has a driver's seat, an activation switch, an accelerator pedal, a brake pedal, a steering wheel, a plurality of control levers (which are not shown), and the like provided therein.

Indicated at 6 is each of left and right front wheels rotatably provided to a front lower portion of the vehicle body 2. These respective front wheels 6 constitute steering wheels used for steering (a steering operation) by a driver of the dump truck 1.

Indicated at 7 is each of left and right rear wheels rotatably provided on a rear lower side of the vehicle body 2. These respective rear wheels 7 constitute drive wheels of the dump truck 1.

Figure 3:
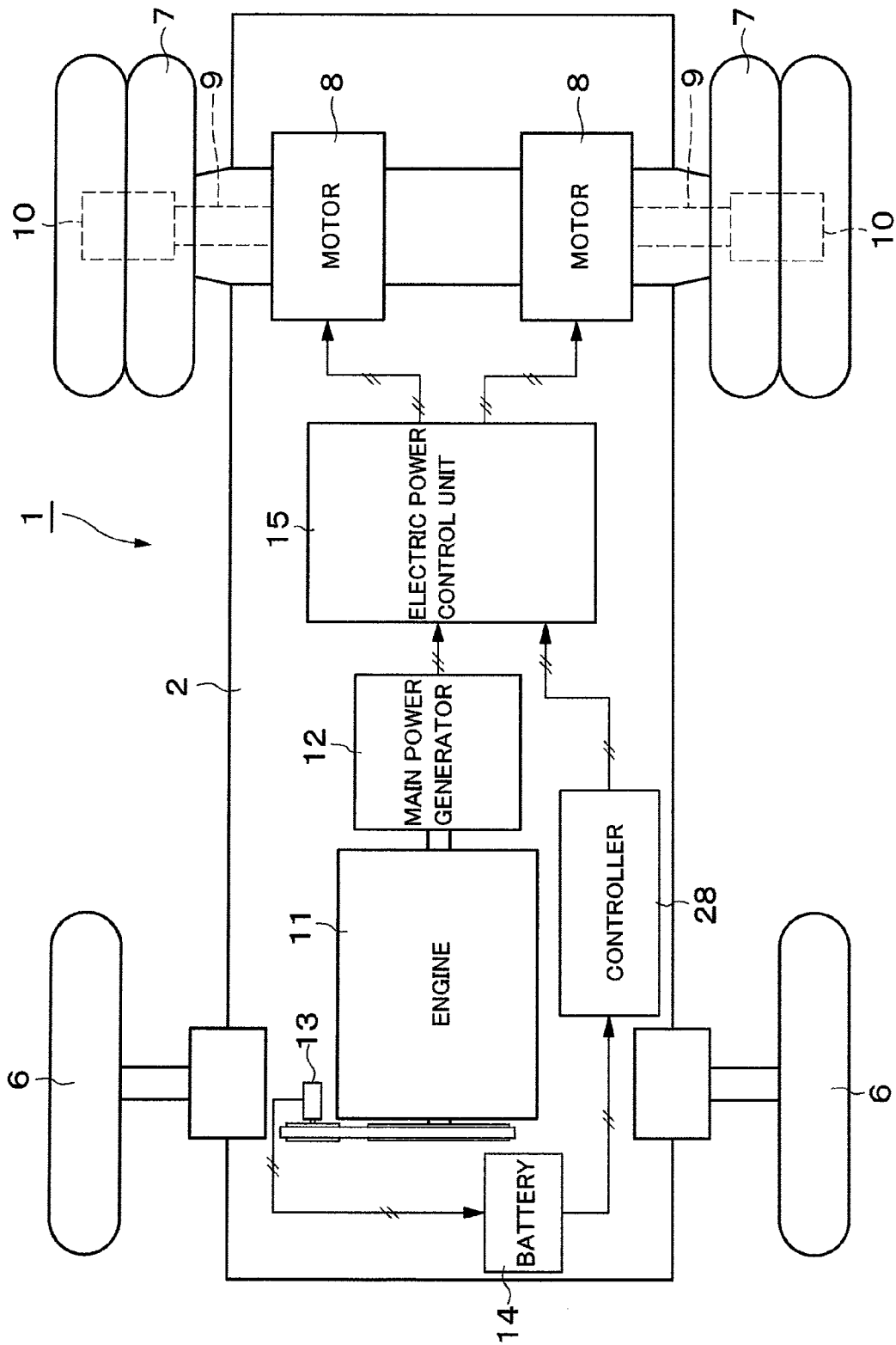
FIG. 3 is an overall block diagram showing the dump truck in FIG. 1.

Designated at 8 is each of left and right wheel drive motors as drive sources provided on the rear lower side of the vehicle body 2. The wheel drive motor 8 is constituted of a large electric motor formed of, for example, a three-phase induction motor, a three-phase brushless direct current motor, and the like, and it is driven to rotate based on power supply from a below-described electric power control unit 15. As shown in FIG. 3, since the wheel drive motors 8 drive the left and right rear wheels 7 to independently rotate, the wheel drive motors 8 are provided on both the left and right sides of the vehicle body 2. Each wheel drive motor 8 has a rotational shaft 9 as an output shaft, and this rotational shaft 9 is driven to rotate in a forward direction or a reverse direction by the wheel drive motor 8. The rotational shaft 9 is coupled to the rear wheel 7 through, for example, a planetary gear reduction mechanism 10 having a plurality of stages. As a result, rotation of the rotational shaft 9 is decelerated by the planetary gear reduction mechanism 10, for example, with a reduction ratio of approximately 30 to 40, and the rear wheel 7 is driven to travel with large rotational torque.

Denoted at 11 is an engine as a prime mover placed below the cabin 5 and provided on the vehicle body 2. This engine 11 is constituted of, for example, a large-sized diesel engine. As shown in FIG. 3, the engine 11 drives a main power generator 12 to generate three-phase alternating current power (for example, approximately 1500 kW) and also drives a direct current auxiliary power generator 13. This auxiliary power generator 13 is connected to a battery 14 serving as a power supply of a controller 28, and charge the battery 14.

The engine 11 drives a hydraulic pump (not shown) functioning as a hydraulic pressure source to rotate. This hydraulic pump has a function of supplying a pressure oil to the hoist cylinder 4, a steering cylinder (not shown) for power steering, and the like.

Figure 4:
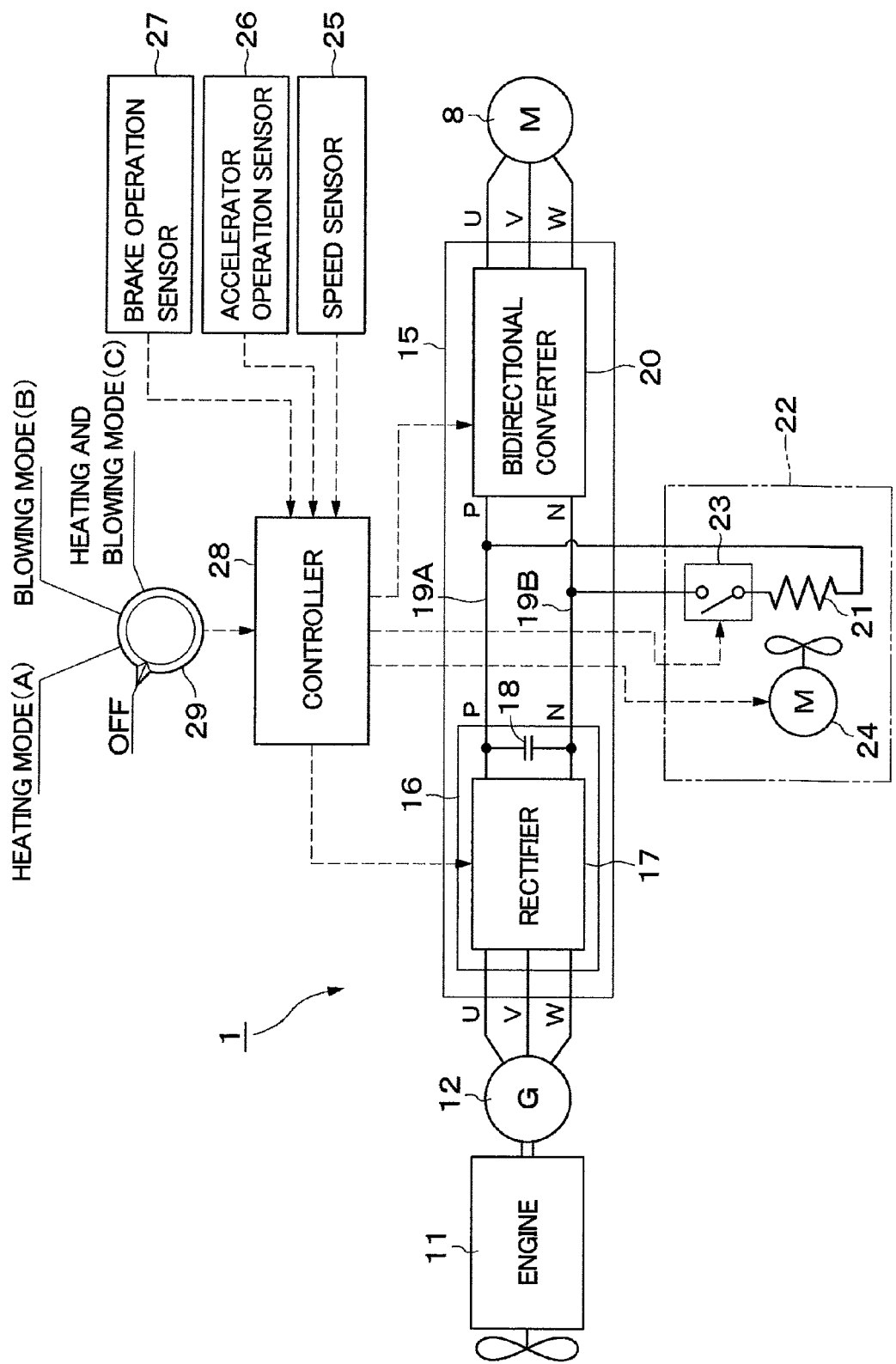
FIG. 4 is an electrical circuit diagram showing the dump truck in FIG. 1.

Designated at 15 is the electric power control unit that controls the power of the dump truck 1 together with below-described controller 28. This electric power control unit 15 is constituted of, for example, a power distribution control board placed on a lateral side of the cabin 5 and provided upright on the deck portion 2A of the vehicle body 2. As shown in FIG. 4, the electric power control unit 15 includes an alternating current to direct current converter 16 and a bidirectional converter 20.

The alternating current to direct current converter 16 is constituted of a rectifier 17 which is formed of a rectifying device such as a diode, a thyristor and the like and performs full-wave rectification with respect to alternating current power and a smoothing capacitor 18 that is connected to a rear part of the rectifier 17 and smoothes a power waveform. This alternating current to direct current converter 16 is connected to an output side of the main power generator 12 and converts three-phase alternating current power having a U phase, a V phase, and a W phase output from the main power generator 12 into direct current power having a P phase and an N phase. Therefore, the alternating current to direct current converter 16 and the main power generator 12 constitute a direct current power supply. Moreover, the alternating current to direct current converter 16 is connected to the bidirectional converter 20 through a pair of electric wiring lines 19A and 19B.

The bidirectional converter 20 is constituted of a plurality of switching elements (not shown) by using, for example, transistors, thyristors, and insulated gate bipolar transistors (IGBTs). This bidirectional converter 20 functions as an inverter that converts direct current power into three-phase alternating current power having a variable frequency when the dump track 1 is traveling. Therefore, the bidirectional converter 20 converts the direct current power output from the alternating current to direct current converter 16 into the three-phase alternating current power having the U phase, the V phase, and the W phase by controlling ON/OFF of the switching elements and supplies this three-phase alternating current power to the wheel drive motor 8.

On the other hand, at the time of deceleration of the dump track 1, the bidirectional converter 20 functions as a converter that converts the three-phase alternating current power into the direct current power. Therefore, the bidirectional converter 20 converts electro motive force consisting of the three-phase alternating current power regenerated by the wheel drive motor 8 into the direct current power by controlling ON/OFF of the switching elements and outputs this direct current power toward a below-described resistor 21.

Denoted at 21 is the resistor connected to the electric wiring lines 19A and 19B between the alternating current to direct current converter 16 and the bidirectional converter 20. This resistor 21 is arranged in a grid box 22 having an angular tubular shape and generates heat in accordance with the direct current power supplied from the bidirectional converter 20 to consume the electro motive force regenerated by the wheel drive motor 8.

Here, as shown in FIG. 2, the plurality of grid boxes 22 are placed on the opposite side of the cabin 5 in a left-right direction to sandwich the electric power control unit 15 and stacked on the deck portion 2A of the vehicle body 2. Each of the plurality of grid boxes 22 accommodates the resistor 21 therein, and the plurality of resistors 21 are connected to the electric wiring lines 19A and 19B in parallel.

A switch 23 is connected to the resistor 21 in series. This switch 23 is constituted by adopting, for example, various types of switching elements by using semiconductor devices, and it is controlled to be switched between a connected position and a disconnected position by a below-described controller 28.

It is to be noted that, the plurality of resistors 21 may be configured to be connected in series. On the other hand, the grid boxes 22 may be configured to be arranged not only above the deck portion 2A but also below the deck portion 2A.

Denoted at 24 is a blower disposed to the grid box 22. This blower 24 is constituted of, for example, an electric motor that is driven by power supply from the electric wiring lines 19A and 19B and supplies cooling air toward the resistor 21. As shown in FIG. 2, the blower 24 is provided at a position in the grid box 22 extending in the left-right direction near the cabin 5, and it supplies the cooling air toward the inside of the grid box 22. As a result, the cooling air passes the peripheral of the resistor 21 in the grid box 22 and is blown toward the outside from an opening portion (an exhaust portion) on the left side of the grid box 22. Therefore, the cooling air heated by the resistor 21 is discharged toward the opposite side of the cabin 5.

Indicated at 25 is a speed sensor as a driving state sensor that detects which one of a driving state and a stop state the dump truck 1 is in. This speed sensor 25 is provided, for example, in the vicinity of the rotational shaft 9, detects a rotational speed of the rotational shaft 9 of the wheel drive motor 8, and calculates a travel speed of the dump track 1 based on this rotational speed. That is, since rotation with a reduction ratio (for example, a reduction ratio of approximately 30 to 40) previously determined by the planetary gear reduction mechanism having the plurality of stages with respect to the rotational speed of the wheel drive motor 8 is transmitted to each rear wheel 7, detecting the rotational speed of the rotational shaft 9 enables obtaining a rotational speed of the rear wheel 7 (a travel speed of the vehicle). An output side of the speed sensor 25 is connected to the controller 28.

Indicated at 26 is an accelerator operation sensor that detects an operation amount of an accelerator pedal. This accelerator operation sensor 26 is constituted of, for example, an angle sensor or a potentiometer and outputs a detection signal in accordance with a stepped state of the accelerator pedal.

Indicated at 27 is a brake operation sensor that detects an operation amount of a brake pedal. This brake operation sensor 27 is constituted of, for example, an angle sensor or a potentiometer and outputs a detection signal in accordance with a stepped state of the brake pedal.

An output side of each of the accelerator operation sensor 26 and the brake operation sensor 27 is connected to the below-described controller 28. The controller 28 determines which one of an acceleration state and a deceleration state the dump truck 1 is in based on the detection signals from the accelerator operation sensor 26 and the brake operation sensor 27.

Designated at 28 is the controller as a control unit constituted of, for example, a microcomputer. This controller 28 is connected to the electric power control unit 15 and the like, controls the switching elements of the bidirectional converter 20 to be switched in accordance with, for example, a driving state of the dump truck 1 and allows the bidirectional converter 20 to function as an inverter or a converter. Specifically, at the time of acceleration of the dump truck 1, the controller 28 allows the bidirectional converter 20 to function as an inverter so that the direct current power from the main power generator 12 can be converted into the three-phase alternating current power. On the other hand, at the time of deceleration of the dump truck 1, the controller 28 allows the bidirectional converter 20 to function as a converter so that the electro motive force consisting of the three-phase alternating current power regenerated from the wheel drive motor 8 can be converted into the direct current power.

Further, the controller 28 is connected to the switch 23 and the blower 24, respectively, switches connection/disconnection between the resistor 21 and the electric wiring lines 19A and 19B, and also switches drive/stop of the blower 24. Specifically, at the time of acceleration of the dump truck 1, the controller 28 turns off (a disconnected state) the switch 23 to stop power consumption of the resistor 21 and also stops the blower 24. On the other hand, at the time of deceleration of the dump truck 1, the controller 28 turns on (a connected state) the switch 23 to allow the power consumption of the resistor 21 and drives the blower 24 to supply the cooling air toward the resistor 21.

It is to be noted that the controller 28 may have not only a configuration that it always turns on the switch 23 of the resistor 21 at the time of deceleration of the dump truck 1 but also a configuration, for example, that it periodically switches ON/OFF of the switch 23. In this case, a duty ratio of the switch 23 may be changed in accordance with the electro motive force regenerated by the wheel drive motor 8.

Designated at 29 is a mode selecting switch that is arranged in the cabin 5 and connected to the controller 28. This mode selecting switch 29 is constituted of, for example, a dial selecting switch. As shown in FIG. 4 and FIG. 5, the mode selecting switch 29 selects any one of a heating mode A, a blowing mode B, and a heating and blowing mode C and switches the heat generation using the resistor 21 to be enabled/disabled and the air blow using the blower 24 to be enabled/disabled in accordance with a selected mode.

Specifically, in the heating mode A, the controller 28 turns on the switch 23 with the blower 24 in the stopped state and uses power supply from the main power generator 12 to generate heat in the resistor 21. In the blowing mode B, the controller 28 drives the blower 24 in the OFF state of the switch 23, thereby blowing air from the blower 24 toward the resistor 21. In the heating and blowing mode C, the controller 28 drives the blower 24 in the ON state of the switch 23 to generate heat in the resistor 21 by the power supply from the main power generator 12 and to blow air from the blower 24 toward the resistor 21.

Further, the mode selecting switch 29 can be changed over to an OFF position. At this OFF position, the controller 28 turns off the switch 23 and stops the blower 24.

It is to be noted that the ON/OFF switching of the switch 23 and the drive/stop of the blower 24 by the mode selecting switch 29 are activated in a stop state of the dump truck 1. In the driving state of the dump truck 1, the controller 28 changeover ON/OFF of the switch 23 and also changeover drive/stop of the blower 24 irrespective of a switching state of the mode selecting switch 29. That is, at the time of acceleration of the dump truck 1, the controller 28 turns off the switch 23 and stops the blower 24. On the other hand, at the time of deceleration of the dump truck 1, the controller 28 turns on the switch 23 and drives the blower 24.

The dump truck 1 according to the first embodiment has the above-described configuration, and an operation of this dump truck 1 will now be explained.

When a driver who has got on the cabin 5 of the dump truck 1 starts the engine 11 depicted in FIG. 4, the main power generator 12 and the auxiliary power generator 13 generate power. The power generated by the auxiliary power generator 13 is fed to the controller 28 through the battery 14. The power generated by the main power generator 12 is fed to the left and right wheel drive motors 8 through the electric power control unit 15. That is, when driving the vehicle to travel, a drive current is supplied from the electric power control unit 15 to each wheel drive motor 8 on the rear wheel 7 side.

Figure 6:
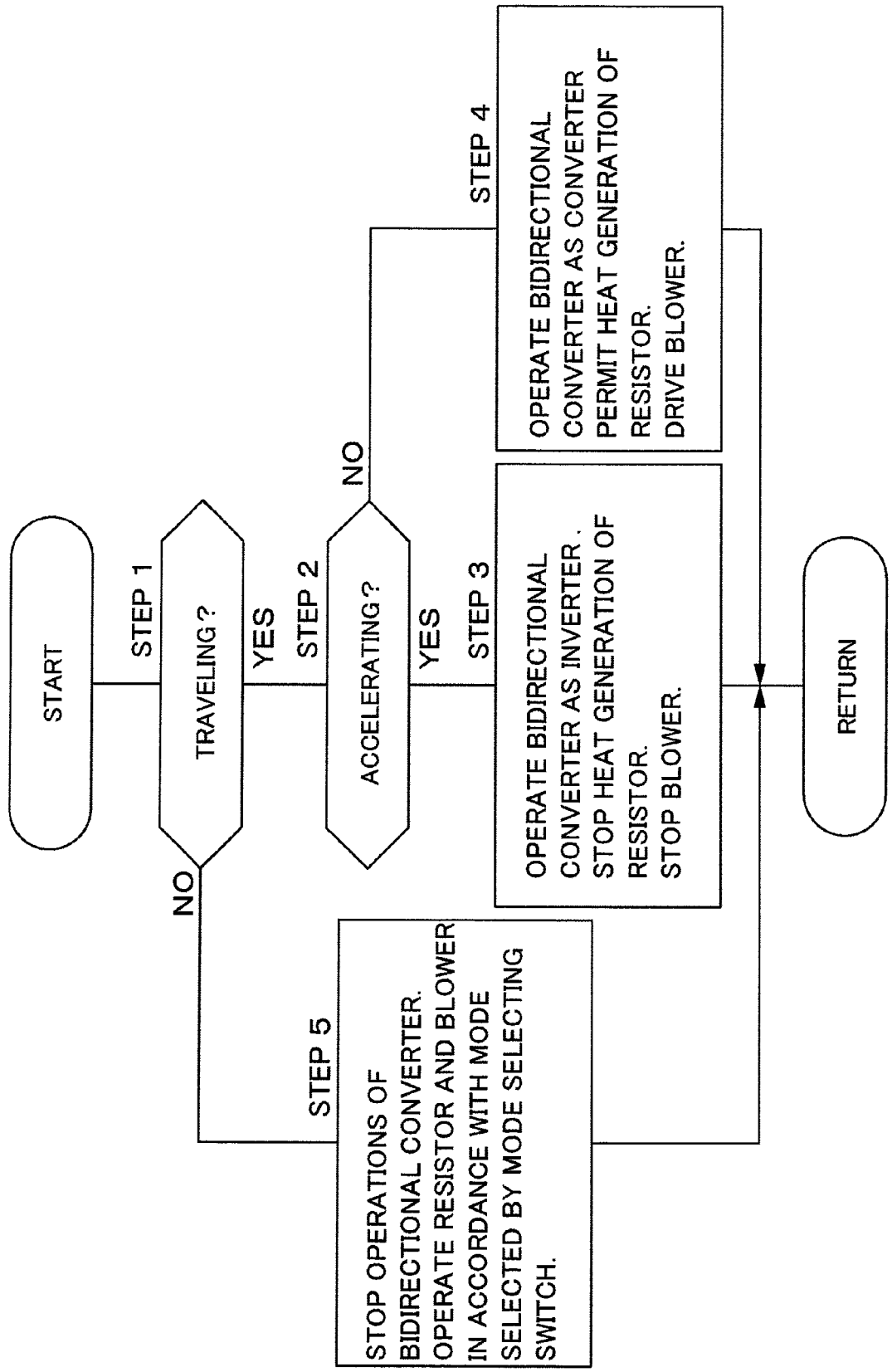
FIG. 6 is a flowchart showing control processing performed by a controller in FIG. 4.

At this time, the controller 28 executes control processing shown in FIG. 6 to control the bidirectional converter 20, the resistor 21, and the blower 24 in accordance with a driving state of the vehicle body 2. Specifically, at a step 1, the controller 28 judges from an output signal of the speed sensor 25 whether the dump truck 1 is traveling or not. When the dump truck 1 is traveling, "YES" is determined at the step 1, and the processing shifts to a step 2. At the step 2, whether the dump truck 1 is accelerating or not is judged based on detection signals from the accelerator operation sensor 26 and the brake operation sensor 27.

When "YES" is determined at the step 2, the dump truck 1 is accelerating. Therefore, the controller 28 shifts to a step 3 where the bidirectional converter 20 is allowed to function as an inverter and the direct current power from the main power generator 12 is converted into the three-phase alternating current power to be supplied to each wheel drive motor 8. At this time, the controller 28 turns off the switch 23 to stop the power consumption of the resistor 21 and also stops the blower 24.

On the other hand, when "NO" is determined at the step 2, the dump truck 1 is decelerating. Therefore, the controller 28 shifts to a step 4 where the bidirectional converter 20 is allowed to function as a converter and the electro motive force consisting of the three-phase alternating current power regenerated by each wheel drive motor 8 converted into the direct current power. In addition, the controller 28 turns on the switch 23 (the connected state) to permit the power consumption of the resistor 21 and drives the blower 24 to supply the cooling air toward the resistor 21. As a result, the electro motive force regenerated by each wheel drive motor 8 is consumed by the heat generation of the resistor 21.

When "NO" is determined at the step 1, the dump truck 1 is at a stop. Therefore, the controller 28 shifts to a step 5 to stop an operation of the bidirectional converter 20 and to control operations of the resistor 21 and the blower 24 in accordance with a mode selected by the mode selecting switch 29.

Meanwhile, to enhance a cooling effect of the resistor 21, the resistor 21 is arranged at a portion of the dump truck 1 that can be easily exposed to outside air. Therefore, the resistor 21 may be frozen up in cold climates or the resistor 21 may get wet by rain water at the time of rainfall, for example. In this case, the insulation properties may be deteriorated between a circuit for the resistor 21 and the vehicle body 2, and regenerative power may not be possibly consumed by the resistor 21, thereby reducing braking force.

To avoid such a trouble, there can be considered a method of, for example, previously feeding electric power to the resistor 21 before traveling of the dump truck 1, melting the ice by the heat generation of the resistor 21, or evaporating the moisture in addition to drying the resistor 21 based on air blow from the blower 24.

However, simultaneously performing the heat generation and the air blow may be inappropriate depending on a state of the resistor 21 and a condition of outside air. For example, when the insulation properties of the resistor 21 have been considerably deteriorated, there is a problem that the resistor 21 cannot sufficiently generate heat and energy efficiency is poor even though the electric power is fed to the resistor 21. On the other hand, when operating the blower 24 in a snowstorm or heavy rains, snow and ice or rain water may be possibly drawn into the periphery of the resistor 21 due to the effect of the air blow, and the insulation properties of the resistor 21 may be further deteriorated.

Considering such a problem, in the first embodiment, the mode selecting switch 29 that selects anyone of the heating mode A, the blowing mode B, and the heating and blowing mode C is provided. Therefore, a driver can select an appropriate one from these three modes in accordance with a state of the resistor 21 or a condition of outside air, such as, presence/absence of freeze-up or immersion of the resistor 21, an amount of rainfall or an amount of snowfall, and the like.

Specifically, for example, in case of a snowstorm or heavy rains, the operator uses the mode selecting switch 29 to select the heating mode A in which the heat generation alone is performed. As a result, the moisture in the periphery can be evaporated by the heat generation of the resistor 21 while avoiding blowing-in of the snowstorm and the like. On the other hand, when water is stored around the resistor 21, the driver uses the mode selecting switch 29 to select the blowing mode B in which the blowing alone is performed. As a result, the water stored around the resistor 21 can be eliminated by the air blow of blower 24. Further, when the resistor 21 is frozen up, the driver uses the mode selecting switch 29 to select the heating and blowing mode C in which the heat generation and the air blow are simultaneously performed. As a result, the resistor 21 can be dried by the air blow of the blower 24 while melting the ice by the heat generation of the resistor 21.

Since the driver can use the mode selecting switch 29 to select an appropriate mode in accordance with a state of the resistor 21 or a condition of outside air in this manner, the insulation properties of the resistor 21 can be previously enhanced before traveling of the dump truck 1, and the regenerative power of the wheel drive motor 8 can be assuredly consumed by the resistor 21.

When the dump truck 1 is traveling, the controller 28 controls operations of the bidirectional converter 20, the resistor 21, and the blower 24 in accordance with acceleration and deceleration of the vehicle body 2. Therefore, at the time of acceleration of the vehicle body 2, the bidirectional converter 20 can convert the direct current power into the alternating current power to be supplied to each wheel drive motor 8 while stopping the heat generation of the resistor 21 and the air blow of the blower 24. On the other hand, at the time of deceleration of the vehicle body 2, the bidirectional converter 20 can convert output of the alternating current power from the wheel drive motor 8 into the direct current power, the heat generation of the resistor 21 consumes this direct current power, and the air blow of the blower 24 cools the resistor 21.

Moreover, when the vehicle body 2 is at a stop, the controller 28 stops an operation of the bidirectional converter 20 and controls operations of the resistor 21 and the blower 24 in accordance with a mode selected by the mode selecting switch 29. Therefore, the driver can select an appropriate mode in accordance with a state of the resistor 21 or a condition of outside air before traveling of the dump truck 1, thereby previously enhancing the insulation properties of the resistor 21.

Figure 7:
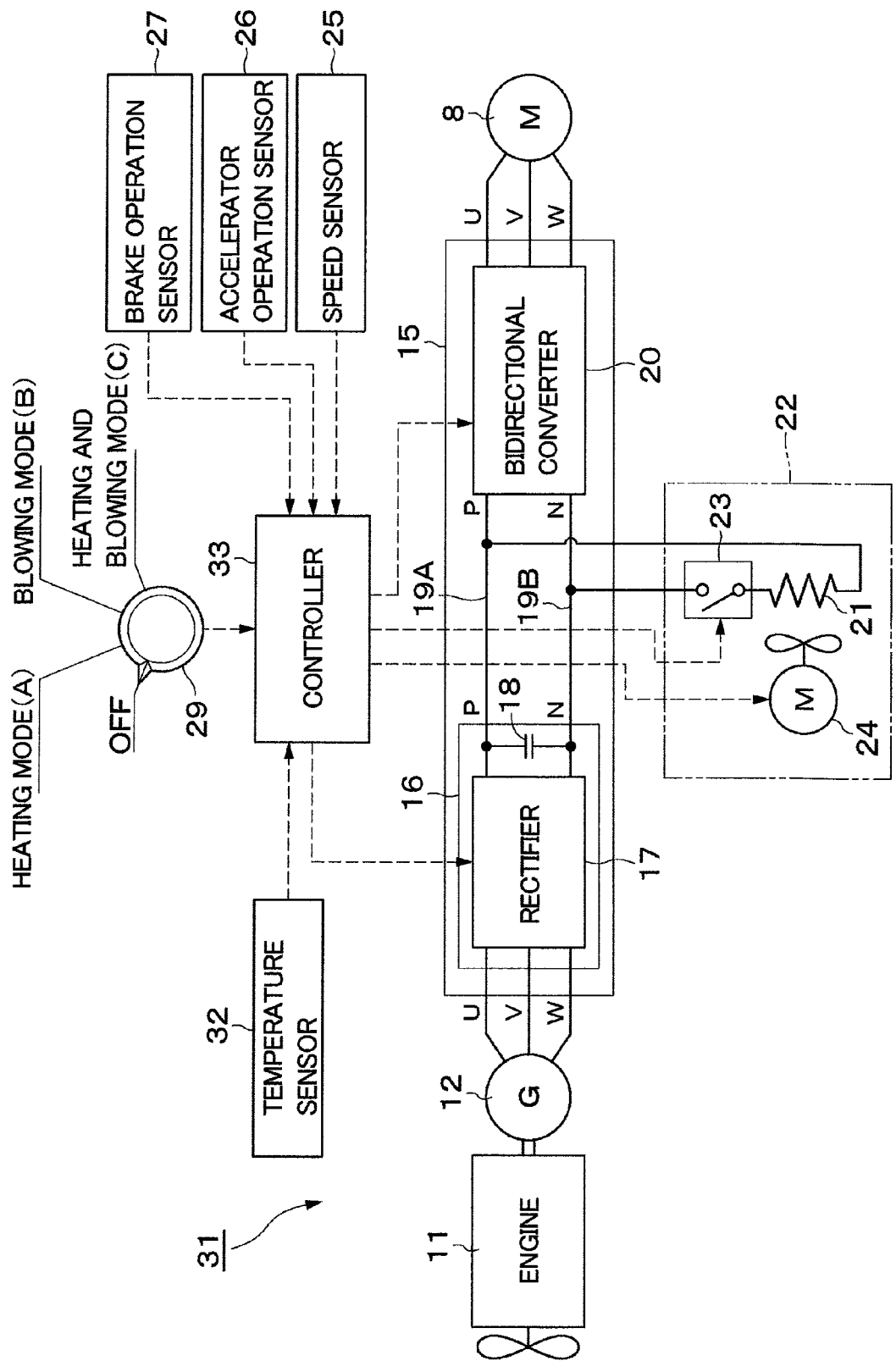
FIG. 7 is an electrical circuit diagram showing a dump truck according to a second embodiment.
Figure 8:
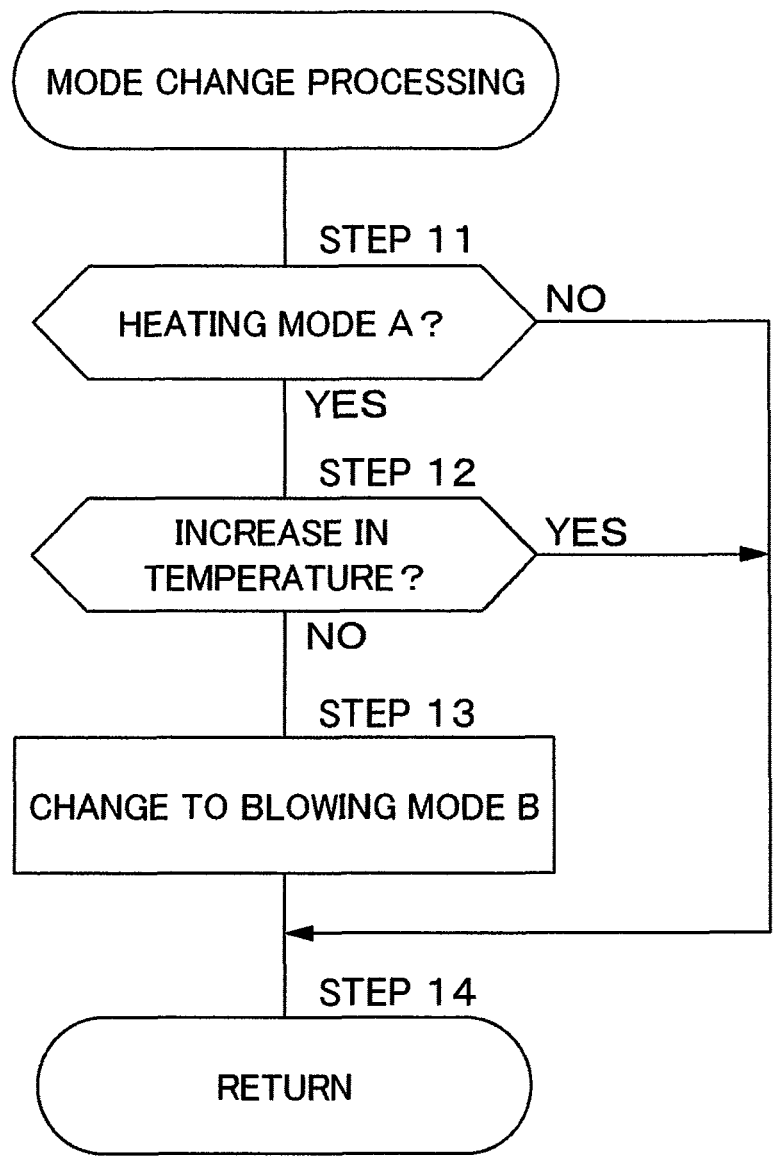
FIG. 8 is a flowchart showing mode change processing.

Next, FIG. 7 and FIG. 8 show a second embodiment according to the present invention. The second embodiment is characterized in that a controller automatically changes a heating mode to a blowing mode when the heating mode is selected and a temperature sensor does not detect an increase in temperature of a resistor. In the second embodiment, the component elements that are identical to those of the foregoing first embodiment will be simply denoted by the same reference numerals to avoid repetitions of similar explanations.

Designated at 31 is a dump truck according to the second embodiment. This dump truck 31 includes wheel drive motors 8, an engine 11, a main power generator 12, an electric power control unit 15, a resistor 21, a switch 23, a blower 24, a mode selecting switch 29, and the like substantially similar to the dump truck 1 according to the first embodiment.

Denoted at 32 is a temperature sensor provided around the resistor 21. This temperature sensor 32 detects a temperature of the resistor 21 or of the periphery of the resistor 21 and outputs a detection signal in accordance with a detected temperature. An output side of the temperature sensor 32 is connected to a below-described controller 33.

Denoted at 33 is the controller according to the second embodiment. This controller 33 is constituted substantially similar to the controller 28 according to the first embodiment, connected to the electric power control unit 15 and the like, and controls switching elements of a bidirectional converter 20 to be switched in accordance with, for example, a driving state of the dump truck 1 so that the bidirectional converter 20 can function as an inverter or a converter. On the other hand, the controller 33 switches heat generation of the resistor 21 to be enabled/disabled and air blow of the blower 24 to be enabled/disabled in accordance with a mode selected by the mode selecting switch 29. However, the controller 33 is different from the controller 28 according to the first embodiment in that the controller 33 executes mode change processing depicted in FIG. 8.

Next, the mode change processing performed by the controller 33 will now be described with reference to FIG. 8.

At a step 11, whether a heating mode A is selected by the mode selecting switch 29 is judged. When "NO" is determined at the step 11, the processing shifts to a step 14 to return. On the other hand, when "YES" is determined at the step 11, the processing shifts to a step 12.

At the step 12, whether a temperature of the resistor 21 is higher than that when the switch 23 is OFF is detected based on a detection signal from the temperature sensor 32. When an ambient temperature of the resistor 21 is higher than, for example, a predetermined temperature, "YES" is determined at the step 12 to maintain the heating mode A, and the processing shifts to the step 14 to return.

On the other hand, when the ambient temperature of the resistor 21 is lower than the predetermined temperature, the temperature of the resistor 21 is not sufficiently higher than that when the switch 23 is OFF, and it is considered that malfunction has occurred in the resistor 21 and the like. Therefore, "NO" is determined at the step 12, and the processing shifts to a step 13 to automatically change the heating mode A to a blowing mode B. Then, the processing shifts to the step 14 to return.

Therefore, the thus configured second embodiment can obtain substantially the same functions and effects as those in the first embodiment. Further, in the second embodiment, the controller 33 is configured to automatically change the heating mode A to the blowing mode B when the heating mode A is selected by the mode selecting switch 29 and the temperature sensor 32 does not detect an increase in temperature of the resistor 21 in this state.

When the temperature of the resistor 21 is not increased in the heating mode A, it is considered that selection of the heating mode A is inappropriate as a situation where, for example, insulation properties of the resistor 21 are considerably lowered. In this case, since the controller 33 automatically changes the current mode to the blowing mode B for effecting air blow using the blower 24, water stored around the resistor 21 is blown off to enhance insulation properties of the resistor 21. As a result, the inappropriate heating mode A can be automatically changed to the blowing mode B, and an appropriate operation can be performed to keep a machine stop time to the minimum.

Figure 9:
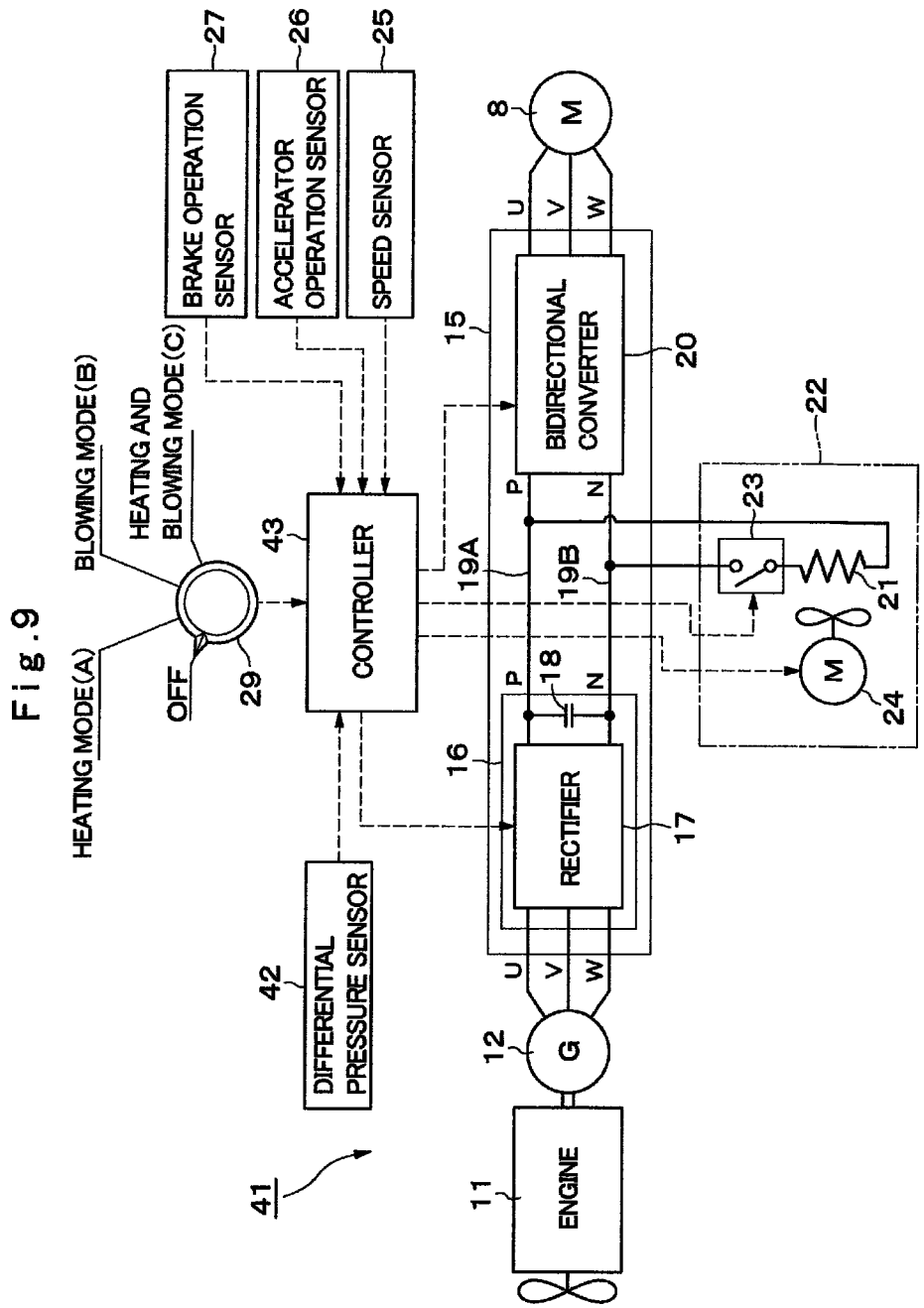
FIG. 9 is an electrical circuit diagram showing a dump truck according to a third embodiment.
Figure 10:
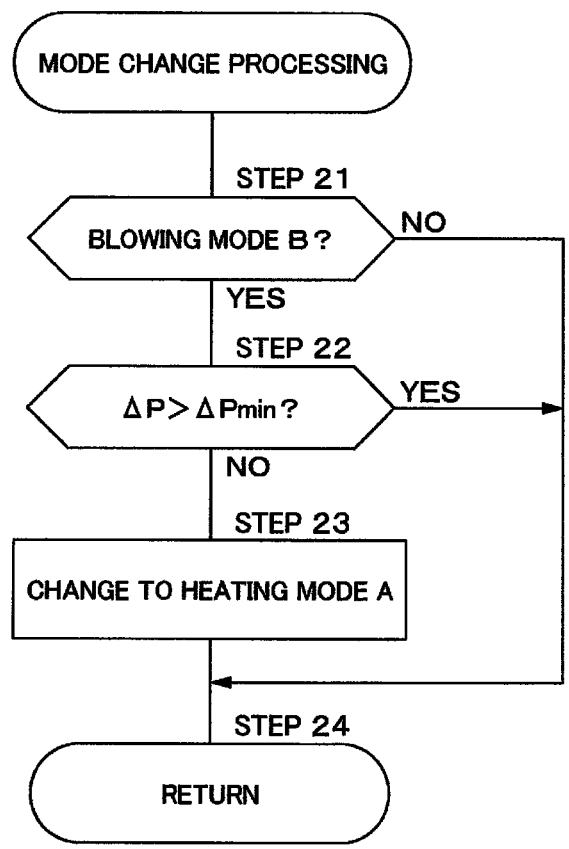
FIG. 10 is a flowchart showing mode change processing.

Next, FIG. 9 and FIG. 10 show a third embodiment according to the present invention. The third embodiment is characterized in that a controller automatically changes a blowing mode to a heating mode when a pressure difference detected by a differential pressure sensor is smaller than a minimum pressure difference when the blowing mode is selected. In the third embodiment, the component elements that are identical to those of the foregoing first embodiment will be simply denoted by the same reference numerals to avoid repetitions of similar explanations.

Designated at 41 is a dump truck according to the third embodiment. This dump truck 41 includes wheel drive motors 8, an engine 11, a main power generator 12, an electric power control unit 15, a resistor 21, a switch 23, a blower 24, a mode selecting switch 29, and the like substantially similar to the dump truck 1 according to the first embodiment.

Denoted at 42 is a differential pressure sensor provided to a grid box 22. This differential pressure sensor 42 detects a pressure difference $\Delta P$ between the upstream side and the downstream side of the resistor 21 with respect to a blowing direction of the blower 24 and outputs a detection signal in accordance with this pressure difference $\Delta P$. An output side of the differential pressure sensor 42 is connected to a below-described controller 43.

Denoted at 43 is the controller according to the third embodiment. This controller 43 is configured substantially similar to the controller 28 according to the first embodiment, connected to the electric power control unit 15 and the like, and controls switching elements of a bidirectional converter 20 to be switched in accordance with, for example, a driving state of the dump truck 1 so that the bidirectional converter 20 can function as an inverter or a converter. Moreover, the controller 43 switches heat generation of the resistor 21 to be enabled/disabled and air blow of the blower 24 to be enabled/disabled in accordance with a mode selected by the mode selecting switch 29. However, the controller 43 is different from the controller 28 according to the first embodiment in that the controller 43 executes mode change processing depicted in FIG. 10.

Next, the mode change processing executed by the controller 43 will now be described with reference to FIG. 10.

At a step 21, whether the blowing mode B is selected by the mode selecting switch 29 is judged. When "NO" is determined at the step 21, the processing shifts to a step 24 to return. On the other hand, when "YES" is determined at the step 21, the processing shifts to a step 22.

At the step 22, whether the pressure difference $\Delta P$ detected by the differential pressure sensor 42 is larger than a predetermined minimum pressure difference $\Delta Pmin$ is judged based on a detection signal from the differential pressure sensor 42. When the pressure difference $\Delta P$ detected by the differential pressure sensor 42 is larger than the minimum pressure difference $\Delta Pmin$, "YES" is determined at the step 22 to maintain the blowing mode B, and the processing shifts to the step 24 to return.

On the other hand, when the pressure difference $\Delta P$ detected by the differential pressure sensor 42 is smaller than the minimum pressure difference $\Delta Pmin$, it is considered that malfunction has occurred in the blower 24. Therefore, "NO" is determined at the step 22, and the processing shifts to a step 23, thereby automatically changing from the blowing mode B to the heating mode A. Then, the processing shifts to the step 24 to return.

Therefore, even the thus configured third embodiment can obtain substantially the same functions and effects as those in the first embodiment. Further, in the third embodiment, when the blowing mode B is selected by the mode selecting switch 29 and the pressure difference $\Delta P$ detected by the differential pressure sensor 42 is smaller than the minimum pressure difference $\Delta Pmin$ in this state, the controller 43 is configured to change the current mode to the heating mode A.

When the pressure difference ΔP between the upstream side and the downstream side of the resistor 21 is smaller than the minimum pressure difference ΔPmin in the blowing mode B, it is considered that selection of the blowing mode B is inappropriate like a situation where, for example, malfunction has occurred in the blower 24. In this case, since the controller 43 changes the current mode to the heating mode A for generating heat by using the resistor 21, moisture can be evaporated by the heat generation of the resistor 21, thereby enhancing the insulation properties of the resistor 21. As a result, the inappropriate blowing mode B can be automatically changed to the heating mode A, and an appropriate operation can be performed to keep a machine stop time to the minimum.

It is to be noted that the third embodiment is configured to maintain the blowing mode B when the pressure difference ΔP detected by the differential pressure sensor 42 is larger than the minimum pressure difference ΔPmin. However, the present invention is not limited to the third embodiment, and a configuration may be such that since an abnormality such as clogging has possibly occurred in an exhaust portion when the pressure difference ΔP is larger than a predetermined maximum pressure difference ΔPmax, both the air blow and the heat generation is stopped and also an alert is output to inform a driver of the possibility of the abnormality.

In the second and third embodiments, the mode change processing shown in each of FIG. 8 and FIG. 10 is described as a specific example of the mode change processing device according to the present invention.

Moreover, in each of the foregoing embodiments, each rear wheel drive dump truck 1, 31, or 41 has been explained as an example of the electric working vehicle. However, the present invention is not limited to the same, and it may be applied to, for example, a front-wheel drive dump truck or a four-wheel drive dump truck that drives both front and rear wheels. On the other hand, besides the dump truck, the present invention can be applied to, for example, a wheel type crane, a wheel type hydraulic excavator and the like as a working vehicle equipped with wheels for traveling.

DESCRIPTION OF REFERENCE NUMERALS 1, 31, 41: Dump truck (Electric working vehicle)
2: Vehicle
6: Front wheel
7: Rear wheel (Drive wheel)
8: Wheel drive motor (Electric motor)
11: Engine
12: Main power generator
15: Electric power control unit
16: Alternating current to direct current converter
20: Bidirectional converter
21: Resistor
22: Grid box
23: Switch
24: Blower
28, 33, 43: Controller
29: Mode selecting switch
32: Temperature sensor
42: Differential pressure sensor
A: Heating mode
B: Blowing mode
C: Heating and blowing mode

The invention claimed is:

1. An electric working vehicle comprising:
a traveling drive electric motor provided to a vehicle body;
a bidirectional converter that is provided to said vehicle body converts direct current power from a direct current power supply into alternating current power having a variable frequency to drive said electric motor and converts an alternating current power output from said electric motor into direct current power;
a resistor that is provided to said vehicle body and connected to said bidirectional converter so as to consume electro motive force regenerated by said electric motor;
a blower that supplies cooling air to said resistor;
a controller that is connected to operate said bidirectional converter, said resistor, and said blower; and
a mode selecting switch connected to said controller and configured to select any one mode from a heating mode for performing heat generation in said resistor, a blowing mode for blowing air to said resistor by using said blower, and a heating and blowing mode for simultaneously performing heat generation using said resistor and blowing air to said resistor using said blower,
wherein said controller is configured to control operations of said bidirectional converter, said resistor, and said blower in accordance with an acceleration and a deceleration of said vehicle body when said vehicle body is traveling, and control operations of said resistor and said blower in accordance with a mode selected by said mode selecting switch when said vehicle body is at a stop.

2. The electric working vehicle according to claim 1, further comprising:
an acceleration sensor connected to said controller to determine said acceleration of said vehicle body; and
a brake sensor connected to said controller to determine said deceleration of said vehicle body.

3. The electric working vehicle according to claim 1, wherein said controller is configured to:
convert direct current power from said direct current power supply into alternating current power by said bidirectional converter to be supplied to said electric motor, stop the heat generation of said resistor, and stop the air blowing of said blower when said vehicle body is accelerating,
convert electro motive force of an alternating current regenerated by said electric motor into direct current power by said bidirectional converter, enable the heat generation in said resistor so as to consume the direct current power, and supply cooling air to said resistor by said blower when said vehicle body is decelerating, and
stop operations of said bidirectional converter and control operations of said resistor and said blower in accordance with a mode selected by said mode selecting switch when said vehicle body is at a stop.

4. The electric working vehicle according to claim 1, further comprising:
a temperature sensor that detects a temperature of said resistor; and
a mode change processing device which, in the state of said heating mode being selected by said mode selecting switch, maintains said heating mode when an increase in temperature of said resistor is detected by said temperature sensor and changes to said blowing mode when an increase in temperature of said resistor is not detected by said temperature sensor.

5. The electric working vehicle according to claim 1, wherein said resistor is accommodated in a grid box in which said blower is disposed, further comprising:
a differential pressure sensor that is provided in said grid box to detect a pressure difference between the upstream side and the downstream side of said resistor with respect to a blowing direction from said blower; and a mode change processing device which, in the state of said blowing mode being selected by said mode selecting switch, maintains said blowing mode when the pressure difference detected by said differential pressure sensor is larger than a predetermined minimum pressure difference and changes to said heating mode when the pressure difference detected by said differential pressure sensor is less than said predetermined minimum pressure difference.

6. An electric vehicle transport system of a vehicle body, comprising:
   an electric motor;
   a bidirectional converter that converts direct current power from a direct current power supply into alternating current power having a variable frequency to drive said electric motor and converts an alternating current power output from said electric motor into direct current power;
   a resistor connected to said bidirectional converter to consume electro motive force regenerated by said electric motor;
   a blower that supplies air to said resistor;
   a controller that is connected to operate said bidirectional converter, said resistor, and said blower; and
   a mode selecting switch connected to said controller to changeably select any one of a heating mode for performing heat generation in said resistor, a blowing mode for blowing air to said resistor by using said blower, and a heating and blowing mode for simultaneously performing heat generation using said resistor and blowing air to said resistor using said blower,
   wherein said controller is configured to control operations of said bidirectional converter, said resistor, and said blower in accordance with an acceleration and a deceleration of said vehicle body when said vehicle body is traveling, and control operations of said resistor and said blower in accordance with a mode selected by said mode selecting switch when said vehicle body is at a stop.

7. The electric vehicle transport system according to claim 6, further comprising:
   an acceleration sensor connected to said controller to determine said acceleration of said vehicle body; and
   a brake sensor connected to said controller to determine said deceleration of said vehicle body.

8. The electric vehicle transport system according to claim 6, wherein said controller is configured to:
   convert direct current power from said direct current power supply into alternating current to be supplied to said electric motor power with said bidirectional converter, stop the heat generation of said resistor, and stop the air blowing of said blower when said vehicle body is accelerating,
   convert electro motive force of an alternating current regenerated by said electric motor into direct current power with said bidirectional converter, enable the heat generation in said resistor so as to consume the direct current power, and blow air to said resistor by said blower when said vehicle body is decelerating, and
   stop said bidirectional converter and control said resistor and said blower in accordance with a mode selected by said mode selecting switch when said vehicle body is at a stop.

9. The electric vehicle transport system according to claim 6, further comprising:
   a temperature sensor that detects a temperature of said resistor; and
   a mode change processing device which, in the state of said heating mode being selected by said mode selecting switch, maintains said heating mode when an increase in temperature of said resistor is detected by said temperature sensor and changes to said blowing mode when an increase in temperature of said resistor is not detected by said temperature sensor.

10. The electric vehicle transport system according to claim 6, wherein said resistor is accommodated in a grid box in which said blower is disposed, further comprising:
   a differential pressure sensor provided in said grid box to detect a pressure difference between an upstream side and a downstream side of said resistor with respect to a blowing direction from said blower; and
   a mode change processing device which, in the state of said blowing mode being selected by said mode selecting switch, maintains said blowing mode when the pressure difference detected by said differential pressure sensor is larger than a predetermined minimum pressure difference and changes to said heating mode when the pressure difference detected by said differential pressure sensor is less than said predetermined minimum pressure difference.

* * * * *